July 12, 1932. A. P. LOFSTRAND 1,867,517
PLOW
Filed June 1, 1931 2 Sheets-Sheet 2
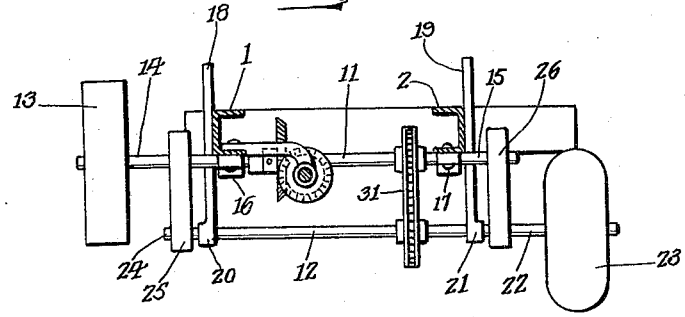
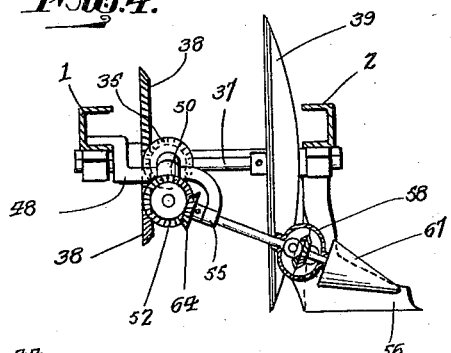
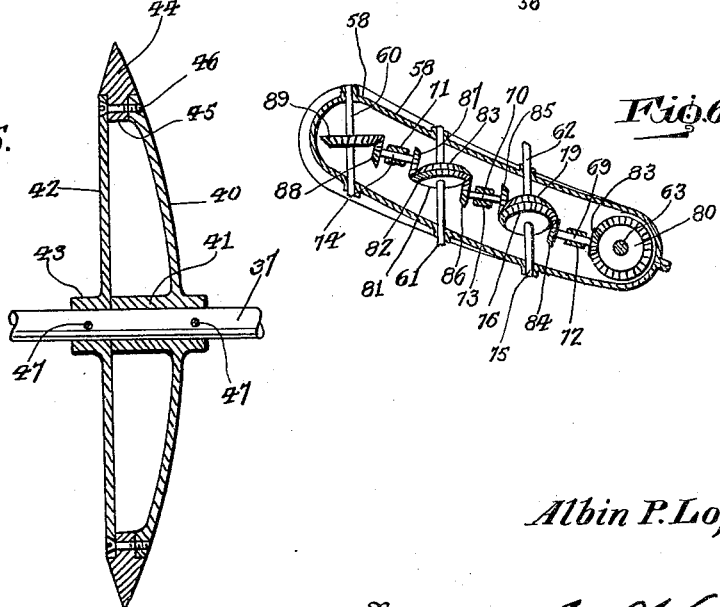
Inventor
Albin P. Lofstrand
By Geo. P. Kimmel
Attorney Patented July 12, 1932

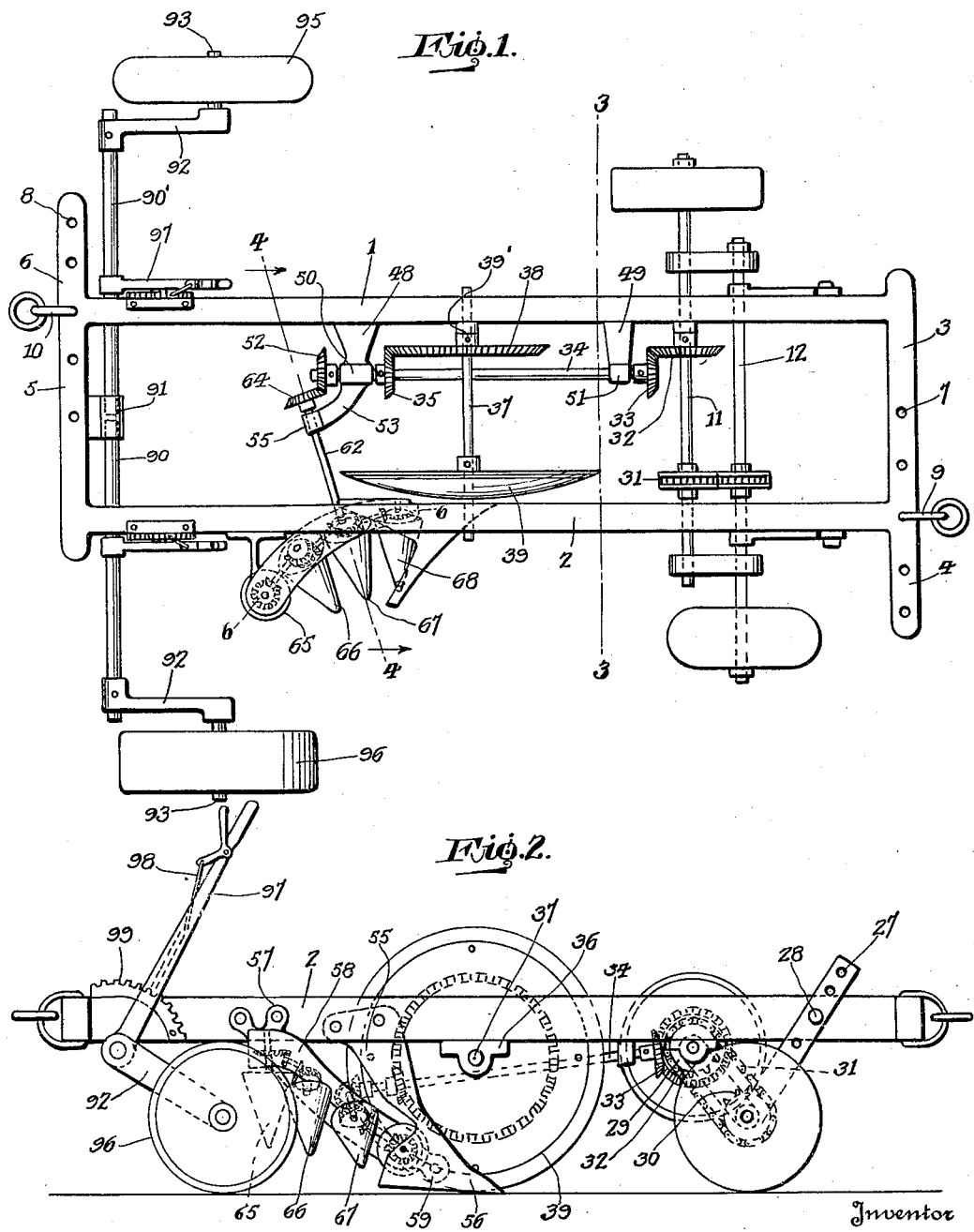

1,867,517

UNITED STATES PATENT OFFICE

ALBIN PAULUS LOFSTRAND, OF CHICAGO, ILLINOIS

PLOW

Application filed June 1, 1931. Serial No. 541,461.

This invention relates to a plow and has for its object to provide, in a manner as hereinafter set forth, a ground working device of the class referred to including a mold board element formed of a series of spaced, tapered, simultaneously rotatable soil abutting members angularly disposed with respect to each other and acting during plowing to lift and pull under the furrow to create traction instead of resistance thereby preventing retardation of the forward movement of the plow.

A further object of the invention is to provide, in a manner as hereinafter set forth, a plow with a mold board element including a series of spaced, tapered, simultaneously rotatable soil abutting members angularly disposed with respect to each other and so constructed and arranged to keep clean in gummy soil.

A further object of the invention is to provide, in a manner as hereinafter set forth, a plow including a sod colter of concavo-convex contour not only acting to cut the sod, but further acting to pull the plow towards the land to be plowed.

Further objects of the invention are to provide, in a manner as hereinafter set forth, a ground working device of the class referred to which is simple in its construction and arrangement, strong, durable, compact, thoroughly efficient in its use, readily assembled and comparatively inexpensive to set up.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the invention as claimed.

In the drawings wherein like reference characters denote corresponding parts throughout the several views:—

Figure 1 is a top plan view of a plow in accordance with this invention.

Figure 2 is a side elevation thereof.

Figure 3 is a section on line 3—3 Figure 1.

Figure 4 is a section on line 4—4 Figure 1.

Figure 5 is a vertical sectional view of the colter.

Figure 6 is a section on line 6—6 Figure 1.

The plow includes a substantially rectangular supporting frame formed with a pair of side bars 1, 2, a front bar 3 projecting, as at 4 at right angles to the forward end of bar 2 and a rear bar 5 projecting, as at 6 at right angles to the rear end of bar 1. The front and rear bars, 3, 5 have lengthwise extending rows 7, 8 respectively of spaced openings for selectively receiving clevis devices 9, 10.

The plow includes a pair of superposed, spaced front axles. The upper of the front axles is indicated at 11 and the lower one at 12. The axle 11 is arranged rearwardly of shaft 12, projects outwardly from the side bar 1 of the supporting frame and carries a ground travelling wheel 13. The projecting portion of axle 11 is indicated at 14. The axle 11 also projects outwardly from the side bar 2 of the supporting frame and such projecting portion is indicated at 15. The bars 1, 2 have fixedly secured to the lower faces thereof bearings 16, 17 for the axle 11.

Secured to the bars 1, 2 and depending therefrom at a rearward inclination from top to bottom are slotted, adjustable hangers 18, 19 provided with bearings 20, 21 respectively at the lower ends thereof for the axle 12. The axle 12 projects from the bearing 21 and such projecting portion is indicated at 22 and carries a wheel 23 for travelling in the furrow. The axle 12 has a portion thereof indicated at 24 projecting from the bearing 20 and extending through an upwardly disposed and rearwardly inclined spacer member mounted on the portion 14 of axle 11. The projecting portion 15 of axle 11 is connected to the projecting portion 22 of axle 12 by an upwardly disposed and rearwardly inclined member 26. The spacer members are loosely mounted on the axles.

The axle 12 can be elevated and lowered with respect to axle 11 on the adjustment of the hangers 18, 19. The slots in the hangers are indicated at 27 and the means for securing a hanger in position at 28. Such means 28 selectively engages in the openings 27 and is also adapted to be connected to a side bar of the supporting frame.

The axles 11, 12 are provided with sprocket pinions 29, 30 respectively connected together by an endless cog chain 31. The axle 11 is formed with a beveled gear 32 which meshes with a beveled pinion 33 on the forward end of a transmission shaft 34, the latter having its rear end provided with a beveled pinion 35.

The side bars of the supporting frame have secured to the lower face thereof bearings 36 for a colter wheel shaft 37, the latter being provided with a beveled gear 38 in mesh with the pinion 35 to provide for the rotation of the shaft 37 when the shaft 34 is driven from the front axles of the plow. The beveled gear 38 is arranged in proximity to and spaced from the side bar 1, as at 39'. Carried by the shaft 37 in proximity to the side bar 2 is a colter wheel 39 having a convex outer face.

The colter wheel includes a concavo-convex body portion 40 provided with a hub 41, a closure disc 42 formed with a hub 43, an annular cutter 44 having a reduced inner portion 45 seated between the disc 42 and portion 40 and fixedly secured in position by the holdfast devices 46. The hubs 41 and 43 are fixedly secured to the shaft 37 by the holdfast devices 47. In cross section the outer part of the cutter 44 is of tapered contour.

Secured to the side bar 1 and extending inwardly therefrom is a pair of brackets 48, 49 provided with bearings 50, 51 respectively for the shaft 34. The shaft 34 is disposed at a downward inclination from front to rear and carries on its rear end a beveled pinion 52 positioned rearwardly of the bracket 48. A rearwardly directed curved arm 53 is formed integral with bracket 48 and is provided with a bearing 55.

Secured at its upper end to the side rail 2 of the supporting frame, rearwardly of the shaft 37 is a depending plow standard 55 terminating at its lower end in a plow share 56 which is outwardly of and opposes the colter wheel 39. The side bar 2 of the supporting frame carries a bracket 57 to which the upper end of a forwardly extending and downwardly inclined casing 58 is secured. The lower end of casing 57 is anchored, as at 59 to the inner side of the plow share 56. Coacting with the plow share is the mold board element and casing 58 forms a part of the latter. The mold board element also includes a set of shafts 60, 61, 62 and 63 which are angularly disposed with respect to each other. The shaft 63 is journaled in the casing 58 at the lower end thereof. The shaft 60 is journaled in the casing 58 at the upper end thereof. The shafts 61, 62 are journaled in the casing 58 between the shafts 60 and 63. The shaft 62 projects from casing 58 and extends through the bearing 54. The shaft 62 carries a beveled pinion 64 which meshes with the beveled pinion 52. The shafts 60, 61, 62 and 63 extend from the casing 58 and have fixed therewith, exteriorly of said casing conoidal shaped members 65, 66, 67 and 8 respectively which bodily rotate with and extend in the same direction as the shafts to which they are connected. The shaft 63 is driven from shaft 62. The shaft 61 is driven from shaft 62 and the shaft 60 is driven from shaft 61. The casing 58 has arranged therein supports in the form of bearings for transmission shafts 69, 70 and 71. The supports for the shafts 69, 70 and 71 are indicated at 72, 73 and 74 respectively. The shaft 62 carries a double beveled gear 75 having one set of beveled teeth indicated at 76 and the other set at 79. The shaft 63 carries a beveled gear 80. The shaft 61 carries a double beveled gear 81 having one set of beveled teeth indicated at 82 and the other set at 83. The shaft 69 is provided with a beveled pinion 83 which meshes with the beveled gear 80 and it is also provided with a beveled pinion 84 which meshes with the set of teeth 76 of gear 75. The shaft 70 carries a beveled pinion 85 which meshes with the set of teeth 79 of gear 75. The shaft 70 also carries a beveled pinion 86 which meshes with the set of teeth 83 of pinion 81. The shaft 71 also is provided with a beveled pinion 88 which meshes with a beveled gear 89 carried by the shaft 60. The arrangement set forth provides for the simultaneous operation of the shafts 60, 61, 62 and 63 and which in turn will simultaneously rotate with the conoidal shaped members 65, 66, 67 and 68. The said members provide the mold board element with a series of rotatable soil abutting members travelling against and acting to lift and pull under the soil and to create traction instead of resistance preventing thereby the retardation of the forward movement of the plow during the plowing action. The rotatable members are angularly disposed with respect to each other and are arranged in what may be termed a curved row to facilitate their action on and the travel thereof against the inner face of the outer wall of the furrow provided by the plow share.

As shown the member 68 is disposed substantially horizontal, the member 67 above the member 68 and disposed at a slight downward inclination with respect to member 68, the member 66 positioned above the member 67 and disposed downwardly at a greater inclination than the inclination of the member 67 and the member 65 is arranged above the member 66 and disposed substantially perpendicular. The arrangement of the members is such to provide a disposition thereof in a row upon a compound curve. The casing 58 is curved substantially similar to the curvature of the row in which the rotatable soil abutting members are arranged.

The rear axle of the plow is formed of two parts 90, 90' for side hills etc. The parts 90, 90' at their inner ends are mounted in a bearing bracket 91 which depends from the rear bar 5 of the supporting frame. The parts 90, 90' project a substantial distance from the bars 1, 2 and are provided with hangers 92 formed with spindles 93 upon which the rear wheels 95, 96 are mounted. The parts of the rear axle are formed with upstanding lever arms 97 carrying pawl and ratchet mechanisms 98 for engagement in racks 99 for the purpose of maintaining the parts of the rear axle in set position. The racks 99 are secured to the bars 1, 2 of the supporting frame and project upwardly therefrom. The levers, pawl and ratchet mechanisms and racks 99 permit of independently shifting the parts of the rear axle for the purpose of elevating and lowering the wheels 95, 96 and to maintain the wheels in adjusted position.

The rotatable soil abutting members are arranged in spaced relation, and their arrangement relatively to each other is such that they will be kept clean in gummy soil. The setting up of the colter wheel 39 so that its convex face opposes the plow share will pull the plow towards the land to be plowed. The wheel 37 will also cut the ground during the plowing operation.

The mold board element is what may be termed a roll away mold board and the colter wheel is set up with its convex face outwardly also to obtain space for the gear drive of the soil abutting elements of the mold board.

What I claim is:—

1. A plow comprising a mold board element including a plurality of rotatable soil abutting members angularly disposed with respect to each other, each of said members being of conoidal contour and having the apex at the outer end thereof, driving means connected to the inner ends of said members for rotating them, and supporting means for said driving means.

2. A plow comprising a mold board element including a plurality of rotatable soil abutting members angularly disposed with respect to each other, driving means connected to said members, means for simultaneously rotating them, and supporting means spaced from said members for said driving means.

3. A plow comprising a mold board element including a plurality of rotatable soil abutting members angularly disposed with respect to each other, each of said members being of conoidal contour and having the apex at the outer end thereof, and a driven gear chain connected with said members for simultaneously rotating them.

4. In a plow, a mold board element including a driving and a plurality of driven shafts, drive connections between said driving shaft and said driven shafts for simultaneously operating said shafts in unison, said shafts being angularly disposed with respect to each other, conoidal shaped soil abutting members, each of said members centrally of its larger end fixed to one of said shafts, whereby said members rotate in unison with said shafts, each of said members disposed in the same plane as the shaft to which it is attached.

5. A plow comprising a frame, a plow standard fixed at its upper end to one side of said frame and terminating in a plow share, a driven colter wheel supported from the frame and having a convex side opposing the inner side of said share, a curved mold board element having its upper end anchored to said side of said frame and its other end anchored to said plow share and including a plurality of superposed simultaneously rotatable soil abutting members angularly disposed with respect to each other, a driven gear chain connected with said members for simultaneously driving them, a driving mechanism, a drive connection between said mechanism and wheel, and a drive connection between said mechanism and chain.

6. A plow comprising a frame, a plow standard fixed at its upper end to one side of said frame and terminating in a plow share, a driven colter wheel supported from the frame and having a convex side opposing the inner side of said share, a curved mold board element having its upper end anchored to said side of said frame and its other end anchored to said plow share and including a plurality of superposed simultaneously rotatable soil abutting members angularly disposed with respect to each other, of conoidal contour having the apices thereof at the outer ends thereof, a driven gear chain connected with the inner ends of said members for simultaneously driving them, a driving mechanism, a drive connection between said mechanism and chain, and a drive connection between said mechanism and wheel.

7. In a plow, a mold board element including a plurality of driven soil abutting members angularly disposed with respect to each other and arranged at different elevations, driving means for supporting and rotating said elements simultaneously and supporting means for said driving means, and an operating means for said driving means.

8. In a plow, a mold board element including a plurality of driven soil abutting members angularly disposed with respect to each other and arranged at different elevations, driving means for supporting and rotating said elements simultaneously and supporting means for said driving means, an operating means for said driving means, a driven colter wheel opposing the forward part and arranged inwardly of said element, and a driving connection for the colter wheel connected with and operated from said operating means.

9. A plow comprising a frame, a plow standard fixed at its upper end to one side of said frame and terminating at its lower end in a plow share, a driven colter wheel supported from and within said frame and having a convex side opposing the inner side of said share, a mold board element having its upper end anchored to said frame and its other end anchored to said share and including a plurality of superposed, driven soil abutting elements, a driving mechanism carried by the frame, driven means operated from said mechanism and connected to said members for rotating them, and driven means operated from said mechanism for rotating said wheel.

10. A plow share comprising a mobile supporting structure, a plow standard fixed at its upper end to said structure and having its lower end terminating in a plow share, a driven colter wheel supported from said structure and opposing the inner side of said share, a mold board element having its upper end secured to said structure and its lower end anchored to said share and including driven soil abutting members and a driven means for simultaneously rotating said members, a driving mechanism carried by the frame and connected to said driven means for operating the latter, and driven means operating from the driving mechanism for rotating said wheel.

In testimony whereof, I affix my signature hereto.

ALBIN PAULUS LOFSTRAND.